US011406083B1

(12) United States Patent
Jennings

(10) Patent No.: US 11,406,083 B1
(45) Date of Patent: Aug. 9, 2022

(54) MODULAR PET STEP SECTIONS FOR STAIRCASE

(71) Applicant: Edward Jude Jennings, Salem, MA (US)

(72) Inventor: Edward Jude Jennings, Salem, MA (US)

( * ) Notice: Subject to any disclaimer, the term of this patent is extended or adjusted under 35 U.S.C. 154(b) by 0 days.

(21) Appl. No.: 15/926,725

(22) Filed: Mar. 20, 2018

(51) Int. Cl.
    *A01K 1/035*     (2006.01)
    *E04F 11/025*     (2006.01)
    *E04F 11/02*     (2006.01)

(52) U.S. Cl.
    CPC ............ *A01K 1/035* (2013.01); *E04F 11/025* (2013.01); *E04F 11/0201* (2013.01)

(58) Field of Classification Search
    CPC ..... A01K 1/035; E04F 11/025; E04F 11/0201
    USPC ...... 119/849; 182/20, 151, 157; 52/183, 187
    See application file for complete search history.

(56) References Cited

U.S. PATENT DOCUMENTS

| | | | | | |
|---|---|---|---|---|---|
| 2,206,862 | A | * | 7/1940 | Boyd ...................... | E04F 11/16 52/182 |
| 2,879,556 | A | * | 3/1959 | Lyons ................... | E04F 11/025 33/562 |
| 4,034,525 | A | * | 7/1977 | Yokomori ............. | E04F 11/025 52/188 |
| 4,143,740 | A | * | 3/1979 | Matthews ............. | E04F 11/025 182/93 |
| D287,283 | S | * | 12/1986 | Johnson ............... | E04F 11/0201 182/228.1 |
| 6,643,879 | B1 | * | 11/2003 | Davis ..................... | A01K 15/02 14/69.5 |
| D673,299 | S | * | 12/2012 | Balducki ........................ | D25/63 |
| 8,745,937 | B1 | * | 6/2014 | Mang, Sr. ............... | E04F 11/09 52/182 |
| 2003/0024177 | A1 | * | 2/2003 | Hirata ...................... | B44F 1/08 52/182 |
| 2007/0028534 | A1 | * | 2/2007 | Defehr ................... | B44C 5/043 52/179 |
| 2008/0302312 | A1 | * | 12/2008 | Steffey ................... | A01K 1/035 119/849 |
| 2011/0232214 | A1 | * | 9/2011 | Lin ...................... | E04F 11/0201 52/188 |
| 2013/0212960 | A1 | * | 8/2013 | Freund ................... | E04F 11/09 52/188 |
| 2014/0123910 | A1 | * | 5/2014 | Rorke ................... | A01K 1/035 119/849 |
| 2019/0203476 | A1 | * | 7/2019 | Glassman ............. | E04F 11/025 |

FOREIGN PATENT DOCUMENTS

WO     WO-2014032091 A1 *   3/2014   ........... E04F 11/025

\* cited by examiner

*Primary Examiner* — Joshua K Ihezie
(74) *Attorney, Agent, or Firm* — Law Office of Matthew M Yospin; Matthew Yospin

(57) ABSTRACT

Apparatus for modular steps to retrofit existing staircases are provided. The sections of steps may be connected to each other to fit existing staircases of varying lengths. The sections of steps have shorter treads and risers than the staircases on which they are retrofit, allowing smaller pets and pets for whom mobility is a challenge, to more easily traverse a staircase, and without mechanical or human assistance. The sections of steps may be attached to the framing or finish of the existing staircase.

8 Claims, 6 Drawing Sheets

MODULAR PET STEP SECTIONS FOR STAIRCASE

FIELD OF THE INVENTION

The presently disclosed subject matter relates to retrofitting existing staircases for use by smaller or mobility-challenged animals, and more specifically, to modular pet step sections that are retrofitted over existing staircases without need for bracing or legs for the sections of pet steps.

BACKGROUND OF THE INVENTION

Stairs are difficult or impossible for many pets to traverse, either climbing or descending. Many animals that are small, elderly, and/or infirm find typical stairs to be impassable obstacles in a home. Due in large part to advances in veterinary care and pet nutrition, pets are living longer than ever before. As pet lifespans increase, pets are exhibiting many of the same medical conditions seen in humans: increasing numbers of pets suffer from arthritis, other forms of joint or musculature degeneration, or obesity, among other ailments. When such pets are unable to traverse stairs with their typical walking or climbing gait, they often resort to leaping or "bunny hopping" from stair to stair. Doing so adds to the strain on the joints of an elderly, small, ill, or obese pet, and thus risks injury to the pet. A better solution to the problems of pet mobility on stairs is needed.

When stairs become an impassable obstacle for people, people may move, or alter the home by adding a motorized lift in a stairwell, or adapt in other ways (though not usually by adding a ramp indoors: ramps are possible outdoors, where a greater distance can be traversed leading to a relatively gentle slope, whereas indoors, nearly every ramp would be dangerously steep). When it is not the owner but a pet that is unable to climb or descend stairs, people do not typically move homes, nor do they typically add a chair lift to each stairwell. Rather, people typically help or carry their pets up or down the stairs, or have the pets adapt to living only on one level of the home. Problems with these solutions to the problems presented by pets unable to traverse stairs include the fact that many people cannot, or do not want to, carry their pets up and down stairs, as doing so is difficult and increases the risks of injury to both the person and the pet. Additionally, having a pet confined to only one level of a home is often stressful for the pet, who is then often not able to be near the people in the home, and for the people, who are not able to have the company of the pet nearby. And many pet owners, devoted as they are to their pets, understandably do not want to incur the expense and inconvenience of having a motorized stairlift installed on their stairs.

For pets that are small, elderly, or find movement challenging, solutions exist to assist in mobility in limited circumstances. There are items that function as pet step-stools or ramps to allow such pets to access couches, chairs, beds, vehicles, and other relatively short changes in elevation. Such products are typically in the form of small step-stools, small ramps, or small cast staircases (comprising the treads and risers, and also a frame that rests along the ground for the length of the run of the stairs). While these products are generally adequate for their purposes, such as allowing a pet to climb onto a bed or climb into a vehicle, they do not and cannot solve the problem of allowing a pet to traverse a staircase that is typically 7' to 8' high.

Accordingly, the problems with the prior art for assisting pets in climbing and descending staircases include increased risk of injury for the people carrying the pets if they trip or have their vision obstructed by the pet, or if the pet were to squirm or jump from their arms; increased risk of injury for the pets if they were dropped or if the person tripped; expensive and intrusive mechanical systems; stress and isolations for pets and people alike; and the inability to use small step-stools, mobile staircase units, or ramps aimed at assisting pets to access furniture or vehicles for allowing pets to traverse a staircase.

SUMMARY OF THE INVENTION

The present invention meets all these needs, by disclosing apparatus for modular pet step sections that may be simply and securely retrofitted onto an existing staircase. The present invention facilitates the movement of a relatively small pet, such as a cat or a small dog, or the movement of a pet that has difficultly walking, such as an elderly animal or one with mobility challenges such as arthritis, both up and down an existing staircase.

The present invention can be used to quickly and easily retrofit existing staircases with modular staircase sections that are sized to fit a variety of stairs, and accommodate a range of pets. Note that, in this disclosure of the present invention, when the term "staircase" is used alone without any modifying words, it is used to mean a staircase made primarily for people of an typical range of heights, and the phrase "pet staircase" is used to mean a set of steps that are smaller in scale and intended for animals with shorter legs or reduced mobility, relative to adult people, which may also include (human) children. The presently disclosed invention enables pets to use a staircase without needing a person to carry them, which reduces the risk of injury to the person, and to the pet. By making it possible for pets to move upstairs and downstairs in a home, the present invention reduces the potential for stress on pets and people alike, that can arise when pets are unable to move about inside a home.

The present invention improves on step-stools and short standalone staircase units, such as those aimed at enabling pets to access a piece of furniture or a vehicle. Such products cannot be used safely, or at all, to allow a pet to traverse a full flight of stairs. The present invention also obviates the use of mechanical systems, such as stairlifts, to transport pets up or down a flight of stairs.

These aspects of the present invention, and others disclosed in the Detailed Description of the Drawings, represent improvements on the current art. This summary is provided to introduce a selection of concepts in a simplified form that are further described below in the Detailed Description of the Drawings. This Summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of various embodiments, is better understood when read in conjunction with the appended drawings. For the purposes of illustration, there is shown in the drawings exemplary embodiments; but the presently disclosed subject matter is not limited to the specific methods and instrumentalities disclosed. In the drawings, like reference characters generally refer to the same components or steps of the device throughout the different figures. In the following detailed description, various embodiments of the present invention are described with reference to the following drawings, in which.

DETAILED DESCRIPTION OF THE DRAWINGS

The presently disclosed invention is described with specificity to meet statutory requirements. But, the description itself is not intended to limit the scope of this patent. Rather, the claimed invention might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

In the following description, numerous specific details are set forth to provide a thorough understanding of the invention. But, the present invention may be practiced without these specific details. Structures and techniques that would be known to one of ordinary skill in the art have not been shown in detail, in order not to obscure the invention. Referring to the figures, it is possible to see the various major elements constituting the methods and systems of the present invention.

The present subject matter discloses embodiments of modular pet step sections for use by pets, installed on a staircase. At a high level of overview, the modular pet step sections of the present invention are made so that at least one section of pet steps may be securely attached to a staircase, and optionally, one or more additional sections of pet steps may be attached to each other to span longer staircases.

In the following descriptions of the inventive apparatus of the present disclosure, reference is made to structures and components of an inventive pet staircase 100 and modular pet step sections 110; for further description of such structures and components, refer to the discussion of FIGS. 1-4, below.

Figure 1:
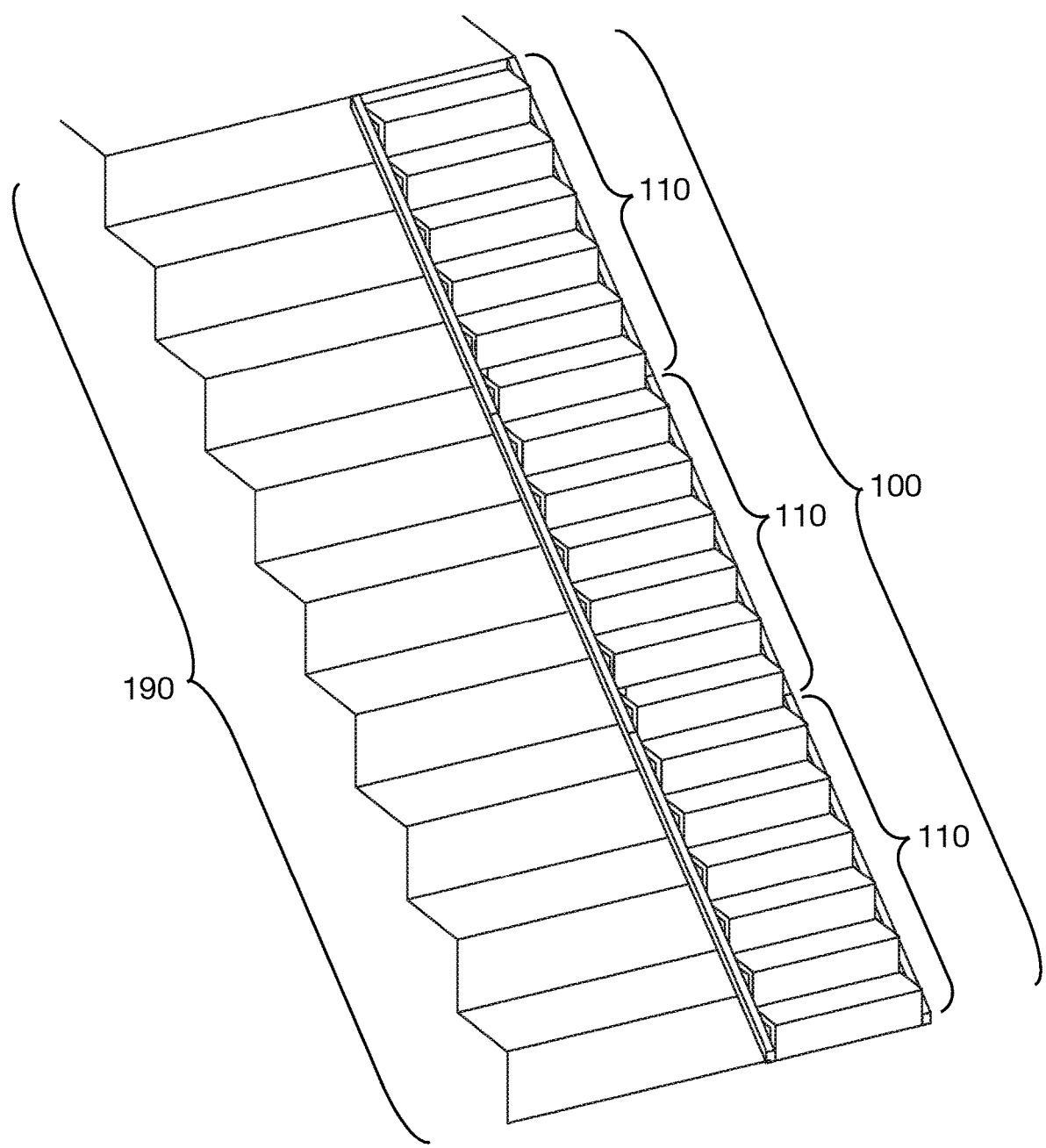
FIG. 1 shows a perspective view of an exemplary set of modular pet step sections of the present invention, assembled for use on an exemplary staircase.
Figure 2:
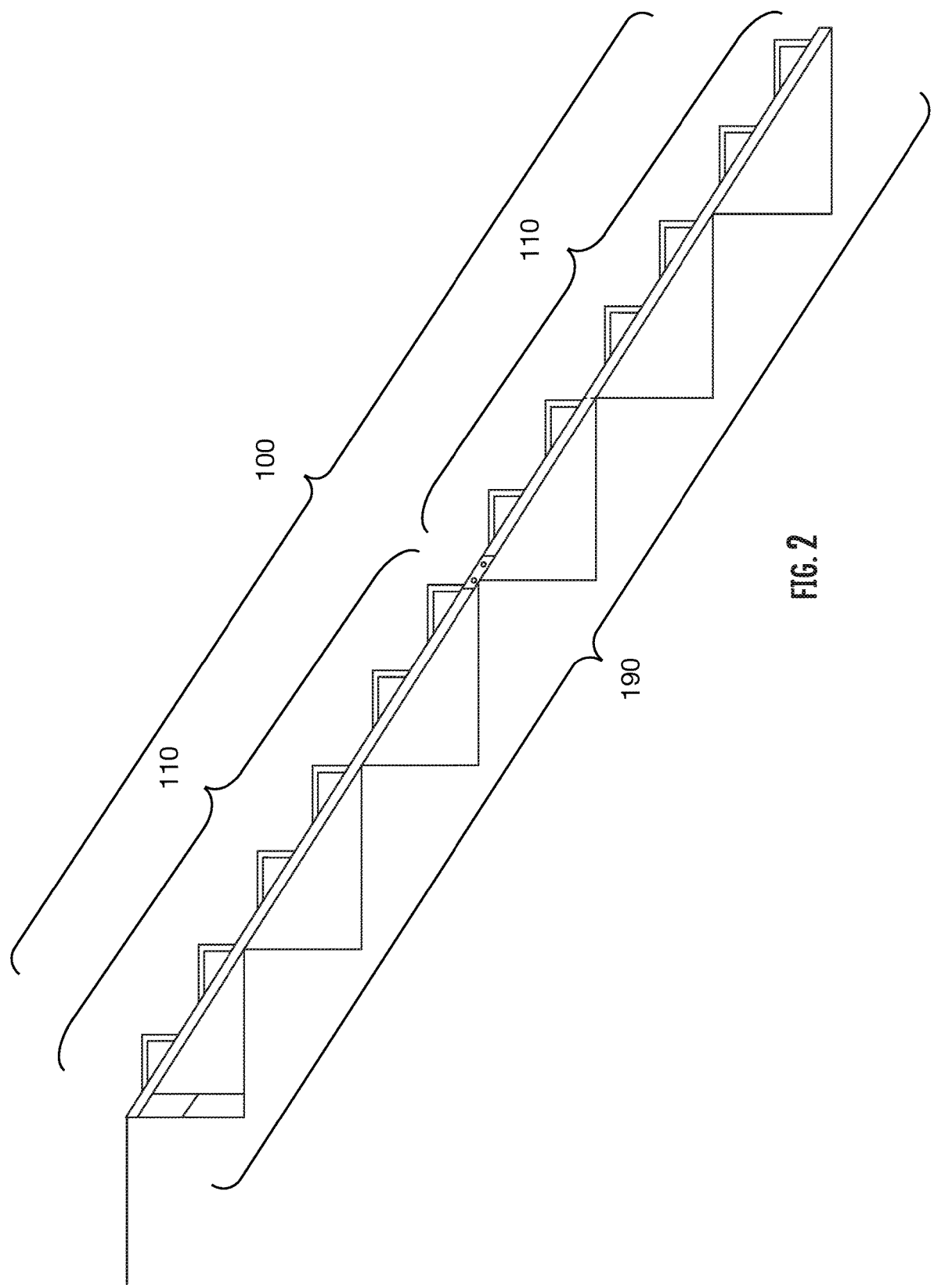
FIG. 2 shows a cross-sectional view, from the side, of an exemplary pair of modular pet step sections of the present invention, assembled for use on an exemplary staircase.

FIG. 1 and FIG. 2 illustrate a plurality of modular pet step sections 110 of the present invention, installed on an exemplary staircase 190, which exemplary staircase 190 comprise a plurality of treads and risers. Note that the exemplary staircase 190 is depicted in FIG. 1 and FIG. 2 only as treads and risers, without depiction of stringers, posts, or walls in the vicinity of the treads and risers—this is not be taken to mean that those elements of a staircase are not present, but only that they are not necessary to the illustration of the present invention. Any individual modular pet step section 110 may be referred to individually in the present disclosure, and for clarity, when a plurality of modular pet step sections 110 are connected to each other, the connected whole will be referred to as a pet staircase 100.

Figure 3:
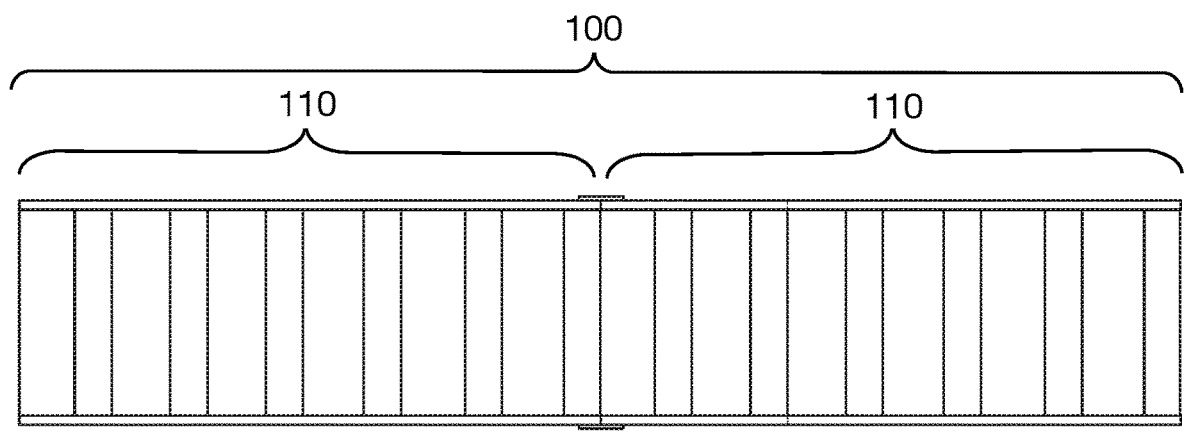
FIG. 3 shows a top elevation view of an exemplary pair of modular pet step sections of the present invention, assembled for use on an exemplary staircase.

FIG. 3 depicts a pet staircase 100, comprising two modular pet step sections 110, which are attached to each other, as is further described below. An exemplary pet staircase 100 may be installed for use, as is disclosed below, on any desired staircase 190, to provide the advantages in navigation of stairs, for small, elderly, or mobility-challenged pets, as described above.

Figure 5:
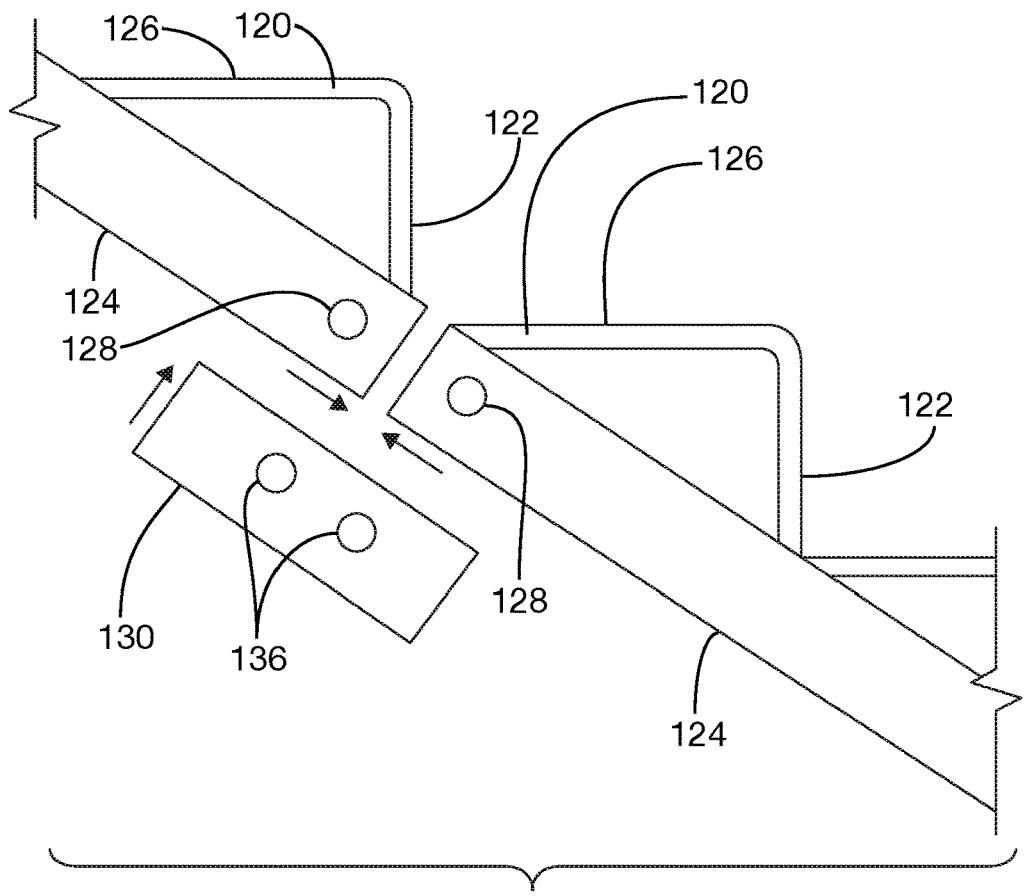
FIG. 5 shows a cross-sectional view, from the side, of an exemplary pair of modular pet step sections of the present invention, depicting a detailed view of the placement and an exemplary connecting mechanism for connecting an exemplary pair of modular pet step sections of the present invention.
Figure 6:
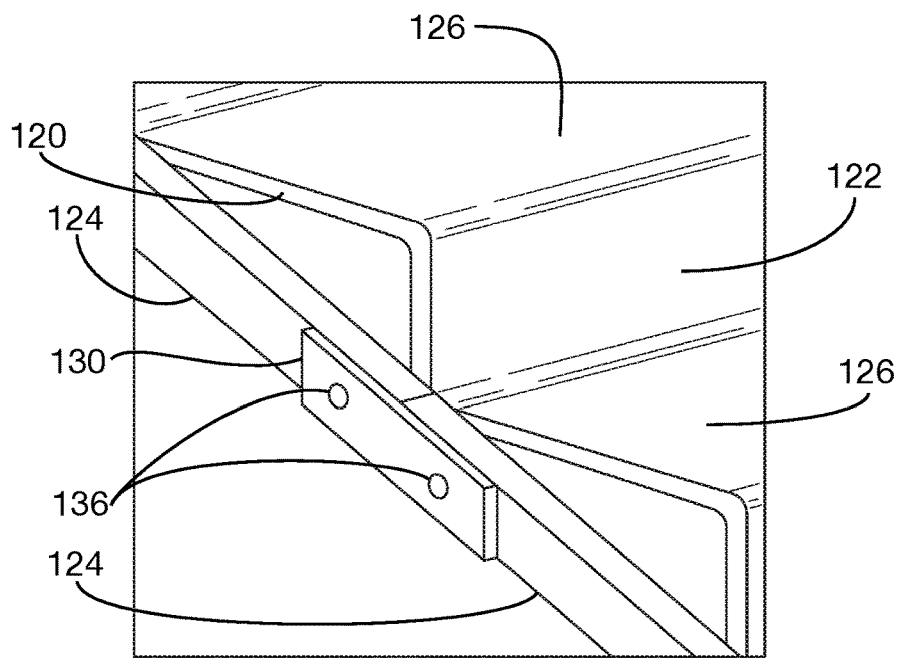
FIG. 6 shows a perspective view of an exemplary pair of modular pet step sections of the present invention, depicting a detailed view of the connected pair of modular pet step sections, including an exemplary connecting mechanism for connecting the pair.

With particular reference to FIG. 5 and FIG. 6, each of the plurality of modular pet step sections 110 comprises a plurality of pet step treads 120, a plurality of pet step risers 122, and a plurality of pet step stringers 124. Each of the plurality of pet step treads 120 may be a flat rectangular prism shape, having a top surface and an underside, a left edge and a right edge, disposed opposite each other, and a front edge and a back edge, disposed opposite each other. The pets walk on the plurality of top surfaces 126 of the plurality of pet step treads 120. Each of the plurality of pet step risers 122 may be a flat rectangular prism shape, having a front surface and a back surface, a left edge and a right edge, disposed opposite each other, and a top edge and a bottom edge, disposed opposite each other. It will be apparent to one of skill in the art that the plurality of pet step treads 120 should all be planar solid objects disposed parallel to each other in planes coincident with their larger faces, and each offset from the others by a regular amount, which is roughly the height of each of the plurality of pet step risers 122, just as steps for humans must be to be useable, and typically as required by building codes. Likewise, the plurality of pet step risers 122 should all be planar solid objects disposed parallel to each other in planes coincident with their larger faces, and each offset from the others by a regular amount, which is roughly the length of each of the plurality of pet step treads 120. Each of the plurality of pet step treads 120 and each of the plurality of pet step risers 122 may be separate pieces that are affixed together, or may in some embodiments be formed as a plurality of single units, as depicted in FIG. 5 and FIG. 6, each comprising a single riser and a single tread, or as a single unit comprising a plurality of pet step treads 120 and a plurality of pet step risers 122, still approximately matching the foregoing description of sets of parallel and perpendicular planar surfaces.

Figure 4:
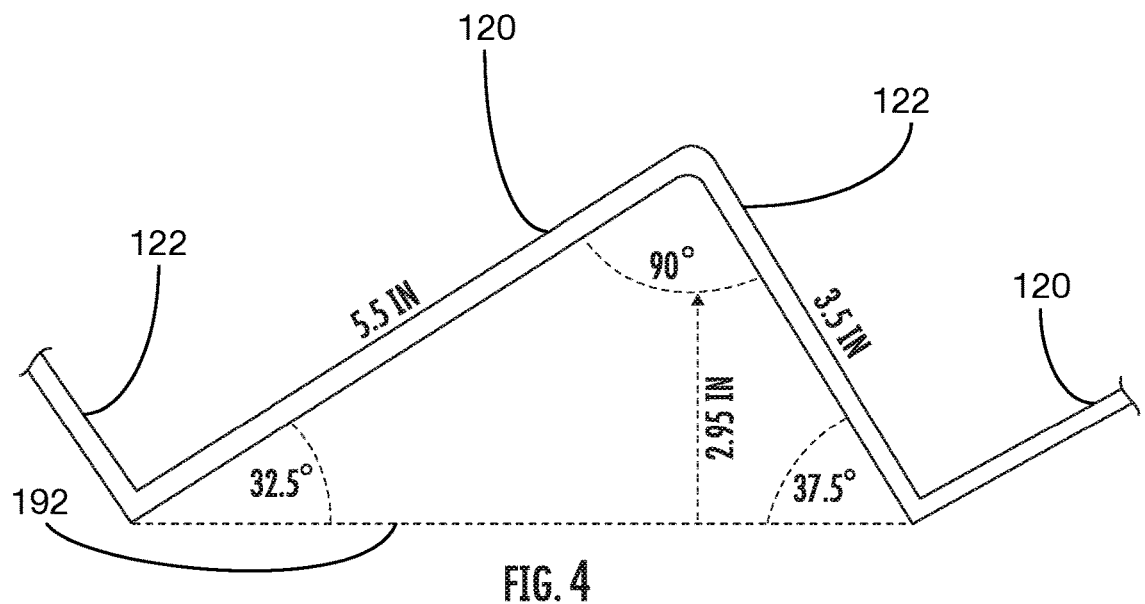
FIG. 4 shows a cross-sectional view, from the side, of a single pet step within a modular pet step section of the present invention.

For structure and stability of the modular pet step sections 110, each of the plurality of pet step treads 120 and each of the plurality of pet step risers 122 is, it has been found advantageous, attached to the plurality of pet step stringers 124 with suitable fasteners, as will be understood by one of skill in the art, to form each of the plurality of modular pet step sections 110. Alternatively, the plurality of pet step treads 120, the plurality of pet step risers 122, and the plurality of pet step stringers 124 may be formed as one integral unit, comprising a single one of the plurality of modular pet step sections 110. FIG. 4 depicts a plurality of pet step treads 120 and a plurality of pet step risers 122 formed as a contiguous integral unit. The plurality of pet step stringers 124 is disposed to contact most or all of the plurality of treads of the exemplary staircase 190, which provides support to the assembled pet staircase 100, and provides structure to reduce any twisting or deflection of its respective modular pet step section 110. Each of the plurality of pet step stringers 124 may have a plurality of stringer holes 128 through the sides of the pet step stringers 124, which may be advantageously disposed towards each end of each of the plurality of pet step stringers 124, as shown in FIG. 5.

It has been found advantageous to have the plurality of pet step treads 120 and the plurality of pet step risers 122 be sized at approximately half-scale of a typical exemplary staircase 190. FIG. 4 depicts an exemplary section of a plurality of pet step treads 120 and a plurality of pet step risers 122, illustrating by way of example the approximate dimensions and relative angles of these exemplary pet step treads 120 and pet step risers 122. The example shown here is scaled to fit a typical staircase 190, in which a typical tread length is 11" and a typical riser height is 7", accordingly at approximately half-scale, the pet step treads 120 are approximately 5.5" long, and the pet step risers 122 are approximate 3.5" high. In this exemplary configuration, the angle formed between the horizontal planes of the pet step treads 120 and the slope of the pet step stringers 124, indicated in FIG. 4 with the dashed line 192, is approximately 32.5°, and the angle between the vertical planes of the pet step risers 122 and the slope of the pet step stringers 124 is approximately 37.5°; these aforementioned angles approximately match the angles and slope in a typical staircase 190. It will be understood by one of skill in the art that other arrangements or relative scales of the treads and risers of the modular pet step sections 110 are possible, including but not limited to approximately ¼ scale, approximately ⅓ scale, and approximately ⅔ scale. With other possible combinations of length and height of the treads and risers of various exemplary staircases 190, scales of the modular pet step sections 110 other than half-scale may be advantageous.

Figure 7:
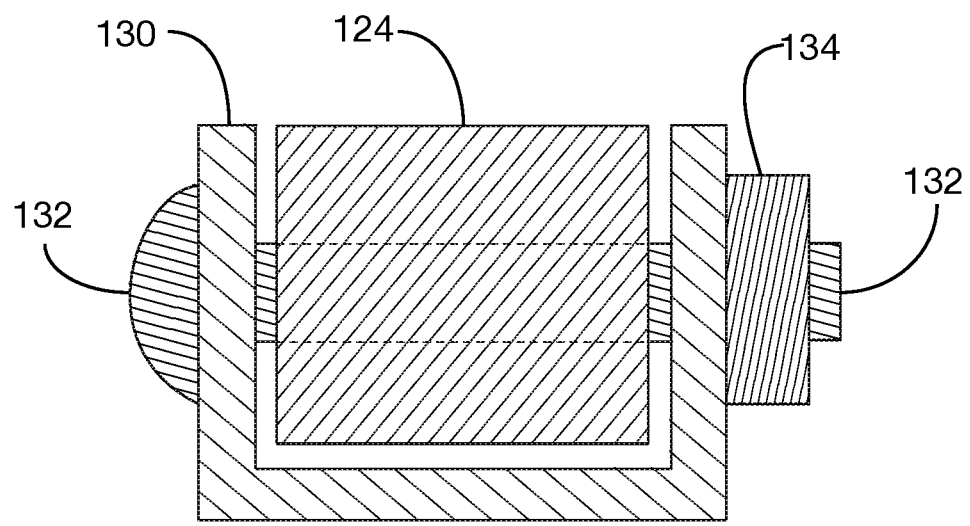
FIG. 7 shows a cross-sectional view of an exemplary connecting mechanism for connecting an exemplary pair of modular pet step sections of the present invention.

With reference to FIG. 7, and also to FIG. 5 and FIG. 6, two or more individual modular pet step sections 110 may, it has been found advantageous, be connected to each other with a plurality of connection brackets 130 and fasteners. Suitable fasteners may be a bolt 132 and nut 134, or, as will be apparent to one of skill in the art, other fasteners may be used. As depicted in the present disclosure, a connection bracket 130 may, it has been found advantageous, comprise a three-sided object, with a first side, a second side, and a third side, with the first and third sides roughly parallel to each other and the second side perpendicular to and connecting the first and third sides. Each of the plurality of connection brackets 130 may have a plurality of connector holes 136, as shown in FIG. 5 and FIG. 6, such connector holes 136 being made in both the first side and the third side of each of the plurality of connection brackets 130.

In FIG. 7, a connection bracket 130 is shown in cross-section in a plane that is perpendicular to each of the three sides of the connection bracket 130, with an exemplary one of the plurality of pet step stringers 124 (of an exemplary first modular pet step section 110) disposed in the interior space defined by the three sides of the connection bracket 130. In FIG. 7, a bolt 132 has been passed through a connector hole 136 in the first side of the connection bracket 130 and through a corresponding one of the stringer holes 128, and then through the connector hole 136 in the third side of the connection bracket 130, such that the bolt 132 is approximately perpendicular (along its main axis, that main axis being aligned with the direction of its insertion, and parallel to the plane in which FIG. 7 shows a cross-section) to the long axis of the pet step stringers 124 and to all three sides of the connection bracket 130. Further, in FIG. 7, a nut 134 has been threaded onto the bolt 132, securing the bolt 132 to the nut 134, and thus securing the connection bracket 130 to the pet step stringer 124. The bolt 132 and nut 134 are also shown in cross-section. By repeating this process with another bolt 132, another nut 134, and at least one more of the plurality of connector holes 136 in a particular connection bracket 130, and passing the bolt 132 through a stringer hole 128 of a pet step stringer 124 of a second modular pet step section 110 placed adjacent to the first modular pet step section 110 (as shown in FIG. 1, FIG. 2, FIG. 3, FIG. 5, and FIG. 6), two modular pet step sections 110 may be affixed to each other, as shown in FIG. 1, FIG. 2, FIG. 3, and FIG. 6. As will be understood by one of skill in the art, the same process and additional components may be used on the other sides of the adjacent modular pet step sections 110 to affix their respective pet step stringers 124 to each other. By affixing a plurality of modular pet step sections 110 to each other, a user may assemble a plurality of modular pet step sections 110 into an exemplary pet staircase 100 comprised of modular pet step sections 110 of the present invention.

In some embodiments of the present invention, apparatus other than a plurality of bolts 132 and a plurality of nuts 134 may be used to affix each of the plurality of connection brackets 130 to the plurality of pet step stringers 124 of the modular pet step sections 110. As will be understood by one of skill in the art, other apparatus include but are not limited to spring pins (also referred to as tension pins), U-bolts, and carriage bolts.

Figure 8:
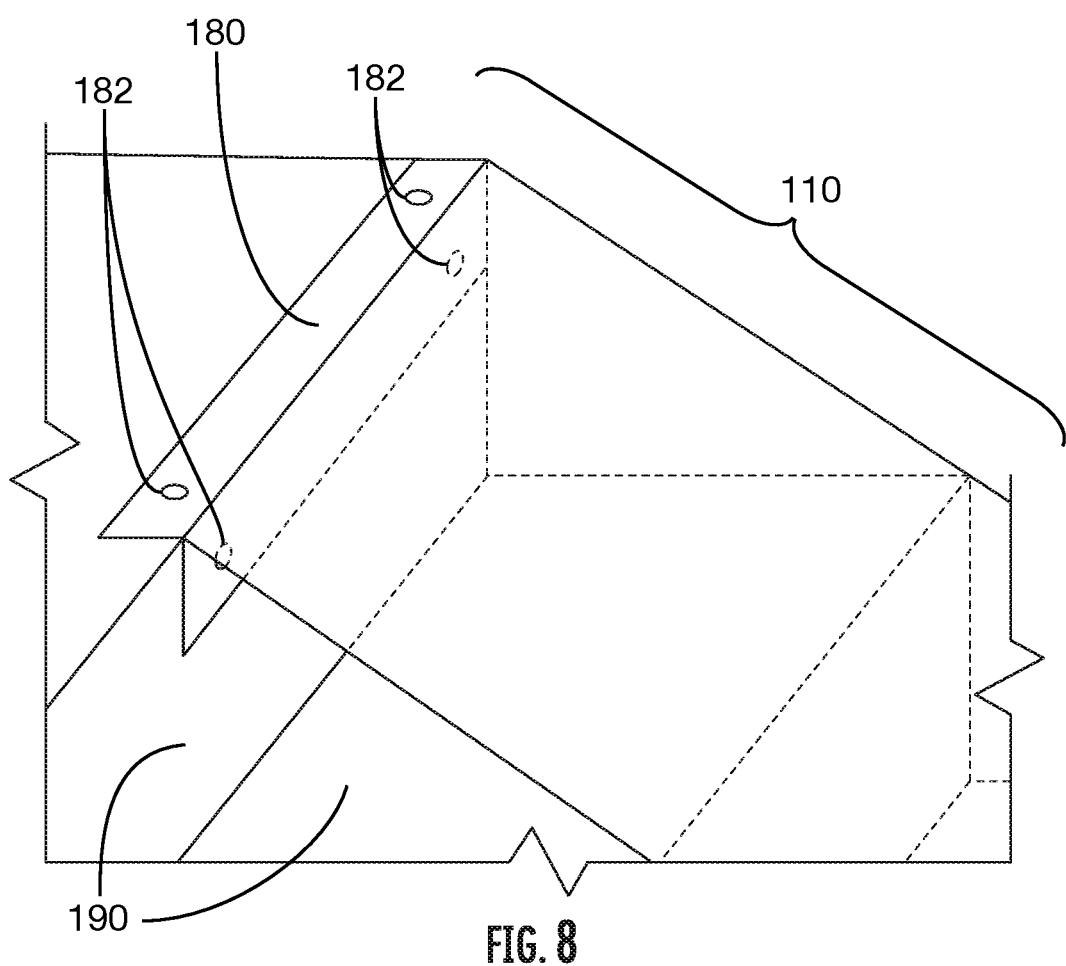
FIG. 8 shows a perspective view of an exemplary modular pet step section of the present invention, anchored for use on a depicted exemplary staircase, depicting one exemplary anchoring mechanism.

With reference to FIG. 8, an anchoring mechanism is depicted for anchoring the topmost of the modular pet step sections 110, which sections comprise an exemplary pet staircase 100, to the exemplary staircase 190. As shown in FIG. 8, the anchoring mechanism is a landing bracket 180. The landing bracket 180 comprises an elongated first surface and an elongated second surface, which surfaces are both approximately planar and which are approximately perpendicular to each other. Each of the landing bracket 180 surfaces has a plurality of landing bracket holes 182. In use in the present invention, the landing bracket 180 may be affixed to the topmost of the plurality of modular pet step sections 110 comprising the pet staircase 100; the topmost of the plurality of modular pet step sections is the modular pet step section closest to the top of the exemplary staircase 190. If only one modular pet step section 110 is used, the landing bracket 180 is attached to it. The landing bracket 180 may be affixed to the top landing of the exemplary staircase 190, with suitable fasteners such as wood screws or other fasteners depending on the material comprising the top landing of the staircase 190 passed through the landing bracket holes 182 of the surface of the landing bracket 180 that is in contact with the top landing of the staircase 190. As will be understood by one of skill in the art, the landing bracket 180 may be affixed to the top riser of the exemplary staircase 190, with suitable fasteners such as wood screws or other fasteners depending on the material comprising the top riser of the staircase 190 passed through the landing bracket holes 182 of the surface of the landing bracket 180 that is in contact with the top riser of the staircase 190.

Figure 9:
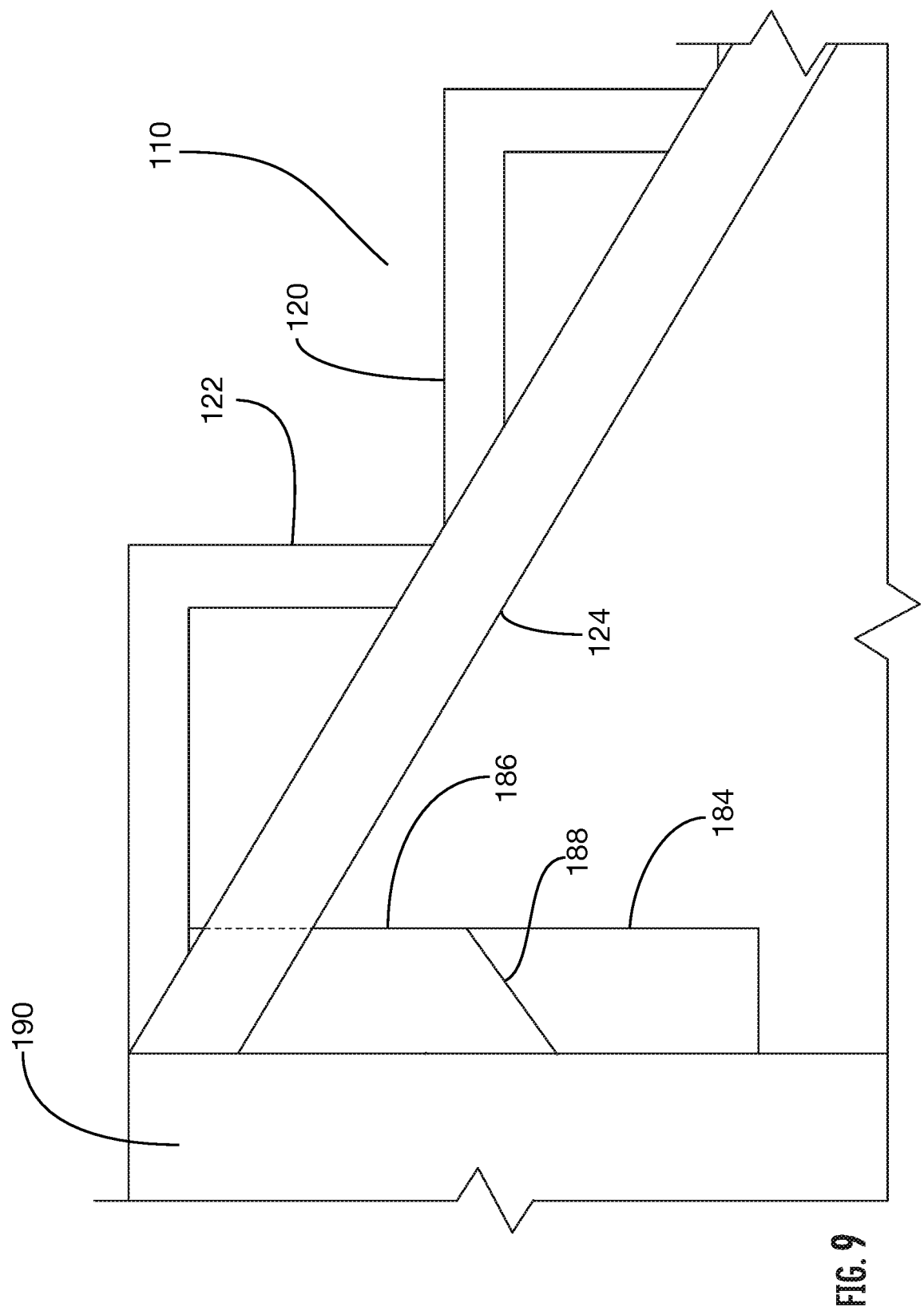
FIG. 9 shows a cross-sectional view of an exemplary modular pet step section of the present invention, anchored for use on a depicted exemplary staircase, depicting one exemplary anchoring mechanism.

With reference to FIG. 9, a different anchoring mechanism, comprising a riser bracket 184 and a pet staircase bracket 186, is depicted. Herein, the riser bracket 184, for affixing the topmost of the modular pet step sections 110 comprising an exemplary pet staircase 100 to the exemplary staircase 190, may be affixed to the topmost riser of the exemplary staircase 190, using wood screws or other suitable fasteners, as will be understood by one of skill in the art. The riser bracket 184 supports a pet staircase bracket 186, to which the topmost of the modular pet step sections 110 comprising an exemplary pet staircase 100 is affixed. If only one modular pet step section 110 is used, the pet staircase bracket 186 is attached to it. The pet staircase bracket 186 may be affixed to the riser bracket 184 with suitable fasteners, or may simply rest on the riser bracket 184 relying on the force of gravity maintain the location of the pet staircase bracket 186 and therefore support the entire pet staircase 100. The riser bracket 184 may have a top surface that is angled such that the top surface is lowest where the riser bracket 184 is in contact with the riser to which it is affixed, and rises as the surface is farther away from the riser, as is shown in FIG. 9 with riser bracket surface junction 188. The pet staircase bracket 186 then has an opposite and matching bottom surface, lowest at the side nearest the riser and highest at the side farthest from the riser, such that the riser bracket 184 and the pet staircase bracket 186 interlock, and the pet staircase bracket 186 (and with it, the pet staircase 100) cannot slide away from the top riser of the staircase 190, such that the pet staircase 100 is securely supported by the combination of the riser bracket 184 and the pet staircase bracket 186. Other inventive embodiments of an anchoring mechanism are possible, including but not limited to clamping the topmost (or sole) modular pet step section 110 to the staircase 190; affixing eyelets, eye hooks, or other hooks to the staircase 190 and corresponding hooks or catchments to the topmost (or sole) modular pet step section 110; or screwing or nailing directly through holes in the frame of the topmost (or sole) modular pet step section 110. In certain embodiments of the present invention, more than one modular pet step section 110 may be anchored to the staircase 190.

The pet staircase 100 of the present invention could readily be used for short or mobility-challenged people as well, including but not limited to toddlers and young children. In such embodiments, the pet staircase 100 would be a more general retrofitted staircase with treads and risers that are scaled down relative to the staircase 190. Other than the terms used to describe the presently disclosed pet staircase 100, all components could remain as described above, with the understanding that the term "pet" as used herein can also mean "small," such that a modular pet step section 110 could be described as a "modular small step section," and similarly for other uses of the term "pet" throughout this disclosure. In any embodiments, other aspects of the present invention may be desirable, including but not limited to particular finishes or surfaces on the above-disclosed treads or risers, such as carpeting to make the surfaces less slippery, which may be better for mobility-challenged animals and people.

Certain embodiments of the present invention were described above.

From the foregoing it will be seen that this invention is one well adapted to attain all the ends and objects set forth above, together with other advantages, which are obvious and inherent to the system and method of the present invention. It will be understood that certain features and sub-combinations are of utility and may be employed without reference to other features and sub-combinations. It is expressly noted that the present invention is not limited to those embodiments described above, but rather the intention is that additions and modifications to what was expressly described herein are also included within the scope of the invention. Moreover, it is to be understood that the features of the various embodiments described herein are not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

Accordingly, what is claimed is:

1. A pet staircase apparatus for retrofitting an existing staircase for use by smaller or mobility-challenged animals, which staircase comprises a plurality of treads and risers, the pet staircase apparatus comprising:
 a plurality of modular pet step sections; each of the plurality of modular pet step sections comprising:
  a plurality of pet step treads, each of which comprises a flat rectangular prism shape, having a top surface and an underside;
  a plurality of pet step risers, each of which comprises a flat rectangular prism shape, having a front surface and a back surface; and
  a plurality of pet step stringers, each of which further comprises a plurality of stringer holes through the sides of the pet step stringers, the pet step stringers have a height that is smaller than a height of the pet step risers; and
  wherein the plurality of pet step treads and the plurality of pet step risers are sized at approximately half-scale of the existing staircase; and
 wherein the plurality of pet step stringers is disposed to contact most or all of the plurality of treads of the existing staircase; and
 wherein two or more individual modular pet step sections are connected to each other, to assemble the pet staircase, with a plurality of connection brackets and fasteners, a connection bracket comprising:
  a three-sided object, with a first side, a second side, and a third side, with the first and third sides roughly parallel to each other and the second side perpendicular to and connecting the first and third sides; and
  a plurality of connector holes in both the first side and the third side of each of the plurality of connection brackets; and
 wherein one of the modular pet step sections is the topmost of the plurality of modular pet step sections; and
 wherein an anchoring mechanism is affixed to the topmost of the plurality of modular pet step sections.

2. The pet staircase apparatus of claim 1, wherein each of the plurality of pet step treads and each of the plurality of pet step risers comprising a modular pet step section are separate pieces that are affixed together.

3. The pet staircase apparatus of claim 1, wherein each of the plurality of pet step treads and each of the plurality of pet step risers comprising a modular pet step section are formed as a plurality of single units each comprising a single riser and a single tread.

4. The pet staircase apparatus of claim 1, wherein each of the plurality of pet step treads and each of the plurality of pet step risers comprising a modular pet step section are formed as a single unit comprising a plurality of pet step treads and a plurality of pet step risers.

5. The pet staircase apparatus of claim 1, wherein each of the plurality of modular pet step sections is formed with the plurality of pet step treads and the plurality of pet step risers being attached to the plurality of pet step stringers.

6. The pet staircase apparatus of claim 1, wherein each of the plurality of modular pet step sections is formed as one integral unit, comprising the plurality of pet step treads, the plurality of pet step risers, and the plurality of pet step stringers.

7. The pet staircase apparatus of claim 1, wherein the anchoring mechanism comprises a landing bracket, the landing bracket comprising an elongated first surface and an elongated second surface.

8. The pet staircase apparatus of claim 1, wherein the anchoring mechanism comprises a riser bracket and a pet staircase bracket, to which pet staircase bracket the topmost of the modular pet step sections is affixed.

\* \* \* \* \*